United States Patent [19]

Alt et al.

[11] 3,923,495

[45] Dec. 2, 1975

[54] (CARBOXYBENZYL) TRIALKYL AMMONIUM SALTS AS PLANT GROWTH REGULANTS

[75] Inventors: Gerhard H. Alt, Creve Coeur; Robert K. Howe, Bridgeton, both of Mo.

[73] Assignee: Monsanto Company, St. Louis, Mo.

[22] Filed: Dec. 4, 1974

[21] Appl. No.: 529,415

[52] U.S. Cl. ............... 71/111; 71/70; 71/72; 71/76; 71/103
[51] Int. Cl.² .................................. A01N 9/20
[58] Field of Search ............ 71/111, 76, 70, 72, 103

[56] References Cited
UNITED STATES PATENTS

| | | | |
|---|---|---|---|
| 3,580,716 | 5/1971 | Mussell et al. | 71/76 |
| 3,671,219 | 6/1972 | Nickell | 71/121 |
| 3,819,357 | 6/1974 | Epstein et al. | 71/90 |
| 3,850,611 | 11/1974 | Nakanishi et al. | 71/121 |

*Primary Examiner*—Lewis Gotts
*Assistant Examiner*—Catherine L. Milk
*Attorney, Agent, or Firm*—Richard H. Shear

[57] ABSTRACT

Certain (carboxybenzyl)trialkylammonium salts of the formula

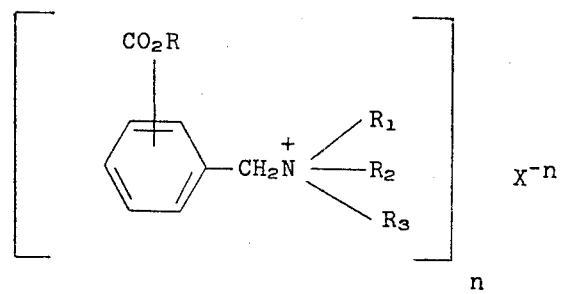

are found to be useful as growth regulators of certain plants.

10 Claims, No Drawings

(CARBOXYBENZYL) TRIALKYL AMMONIUM SALTS AS PLANT GROWTH REGULANTS

The invention relates to a method of regulating the natural growth or development of plants by means of a chemical treatment. More specifically, the invention is directed to a method whereby the natural growth or development of leguminous plants is regulated by applying to said plants a (carboxybenzyl) trialkylammonium salt having the formula

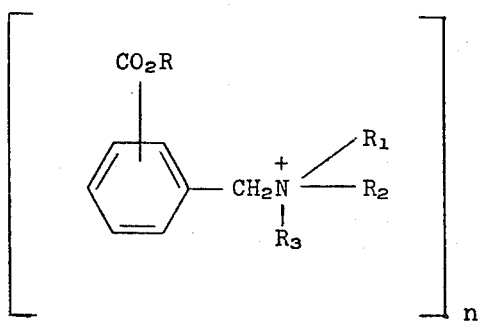

wherein:
R is a lower alkyl;
$R_1$, $R_2$ and $R_3$ are each independently selected from lower alkyl;
$X^{-n}$ is an anion selected from the group consisting of $Br^-$, $Cl^-$, $I^-$, $NO_3^-$, $SO_4^{-2}$ and $CO_3^{-2}$; and
n is the numerical value of the valence of the $X^{-n}$ anion.

By the term "lower" alkyl is meant those alkyl groups having up to 5 carbon atoms, inclusive.

As used herein, the regulation of "plant growth or development" is understood to mean the modification of the normal sequential development of a treated plant to agricultural maturity. Such modifications are most readily observed as changes in size, shape, color or texture of the treated plant or any of its parts. Similarly, changes in the quantity of plant fruit or flowers are also quite apparent from visual inspection. The above changes may be characterized as an acceleration or retardation of plant growth, stature reduction, leaf or canopy alteration, increased branching, terminal inhibition, increased flowering, defoliation, increased root growth, increased cold hardiness and the like. While many of these modifications are desirable in and of themselves, most often it is their effect on the economic result that is of most importance. For example, a reduction in stature of the plant permits the growing of more plants per unit area. A darkening of the foliar color is illustrative of higher chloryphyll activity indicative of improved rate of photosynthesis.

Although phytotoxic amounts of the active ingredient may be employed to exert a herbicidal effect, the regulation of plant growth in accordance with the present invention does not include the total inhibition or killing of such plants. The present invention contemplates the use of an amount of active ingredient which will modify the normal sequential development of the treated plant to agricultural maturity. Such plant growth regulating amounts may vary, not only with the material selected, but also with the modifying effect desired, the species of plant and its stage of development, the plant growth medium and whether a permanent or a transitory effect is sought. It is, however, well within the skill of the art to determine the amount of active ingredient required.

Modification of the plants may be accomplished by applying the active ingredient to seeds, emerging seedlings, roots, stems, leaves, flowers, fruits or other plant parts. Such application may be made directly to the plant part, or indirectly by application to the plant growth medium.

By the term "active ingredient" is meant the active (carboxybenzyl)trialkylammonium salts of the formula

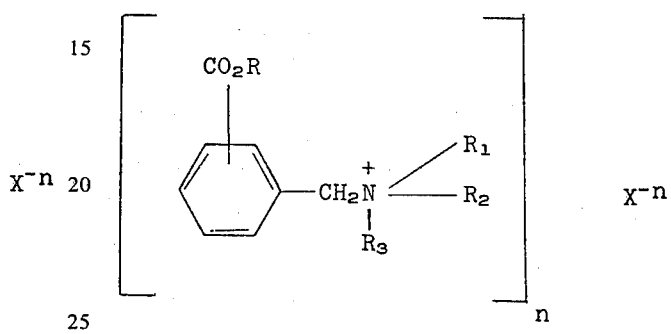

where R, $R_1$, $R_2$, $R_3$, X and n are defined as above. Specifically to be excluded as an active ingredient is the ortho substituted species in which R is propyl and $R_1$, $R_2$ and $R_3$ is methyl. Further, it should be noted that the specific anion used to form the salt does not appear to be critical. As noted above, n is the numerical value of the valence of the anion X. Hence, when X is Br, Cl, I or $NO_3$, n is 1. When X is $SO_4$ or $CO_3$, n is 2. A preferred embodiment of the invention finds R being methyl or propyl and $R_1$, $R_2$, $R_3$ being butyl. Further, meta substituted species are preferred over ortho and para substituted species.

In the practice of the invention, the active ingredient can be used alone or in combination with a material referred to in the art as an adjuvant in either liquid or solid form. To prepare plant growth regulating compositions, the active ingredient is admixed with an adjuvant including diluents, extenders, carriers and conditioning agents to provide compositions in the form of finely-divided particulate solids, granules, pellets, wettable powders, dusts, solutions and aqueous dispersions or emulsions. Thus, the active ingredient can be used with an adjuvant such as a finely divided particulate solid, a solvent liquid of organic origin, water, a wetting agent, dispersing agent or emulsifying agent or any suitable combination of these.

Illustrative finely divided solid carriers and extenders which are useful in plant growth regulating compositions of this invention include the talcs, clays, pumice, silica, diatomaceous earth, quartz, Fullers earth, sulfur, powdered cork, powdered wood, walnut flour, chalk, tobacco dust, charcoal and the like. Typical liquid diluents include Stoddard solvent, acetone, alcohols, glycols, ethyl acetate, benzene and the like. The plant growth regulating compositions of this invention, particularly liquids and wettable powders, usually contain one or more surface-active agents in amounts sufficient to render a given composition readily dispersible in water or in oil. The term "surface-active agent" is understood to include wetting agents, dispersing agents, suspending agents and emulsifying agents. Such surface-active agents are well-known and reference is made to U.S. Pat. No. 2,547,724, Columns 3 and 4, for detailed examples of the same.

Generally, the active ingredients are applied in the form of a composition containing one or more adjuvants which aid in the application of a uniform distribution of the active ingredient. The application of liquid and particulate solid compositions of the active ingredient can be carried out by conventional techniques utilizing, for example, spreaders, power dusters, boom and hand sprayers and spray dusters. The composition can also be applied from airplanes as a dust or spray. Should the application of the plant growth composition to the plant growth medium be desired, this is accomplished by incorporating the compositions in the soil or other media in the area where modification of the plants is desired.

In selecting the appropriate rate of application of the active ingredient, it will be recognized that precise rates will also be dependent upon the mode of application, such as soil incorporation, band application, preplant seed treatment and various other factors known to those skilled in the art. In foliar treatment for the regulation of plant growth, the active ingredients are applied in amounts of from about 0.05 to about 10 or more pounds per acre. Preferred are foliar applications of from 0.05 to 5 pounds of the active ingredient per acre. In application to the soil habitat of germinant seeds, emerging seedlings and established vegetation for the regulation of plant growth, the active ingredients are applied in amounts of from 0.01 to about 20 pounds per acre or more. The application to the soil of from 0.1 to about 10 pounds of active ingredient per acre is preferred. Foliar application to plants beginning to blossom are preferred over other types of applications.

In accordance with the present invention, certain (carboxybenzyl)trialkylammonium salts are found to be effective growth regulators for leguminous plants, as represented by soybean (Glycine max). Significant differences between those legumes treated with the active ingredient and those not treated are found to occur. Among the differences found are a reduction in stature of the treated legume, an alteration in canopy shape and a deepening of the foliar color. Other differences include inhibition of leaf size and axillary bud development. By reducing the stature of the plant, the growing energy utilized by the plant is directed more toward fruiting and less toward vegetative growth. This causes an increase in the plant's efficiency of production as well as an increase in the number of plants per unit area providing for an optimization of crop output. Further, shorter plants undergo less lodging. Thus, when harvested, less plants are lost and the yield is increased. Generally, plants of reduced stature tend to be more vigorous due to a greater tolerance to drought and cold.

In accordance with the practice of the invention, several plant growth regulating compositions were formulated utilizing various trialkylammonium salts as the active ingredient. These compositions were formulated so that they could be applied in tests at a rate the equivalent of 200 gallons per acre. Table I illustrates the formulation of the composition for several application rates of active ingredient. In each formulation, the stock solution utilized is 1% of the active ingredient dissolved in acetone.

TABLE I

| RATE Lbs/Acre (kilos/hectare) | ml. of 1% Stock Solution | ml. Acetone | ml. 0.39% TWEEN 20 In Water As Surfactant |
|---|---|---|---|
| 6.0 (6.72) | 2.0 | — | 3.6 |
| 5.0 (5.60) | 2.0 | 1.0 | 3.7 |
| 3.0 (3.36) | 1.0 | 1.0 | 3.6 |
| 2.5 (2.80) | 1.0 | 2.0 | 3.7 |
| 1.2 (1.34) | 0.4 | 1.6 | 3.6 |
| 1.0 (1.12) | 0.4 | 2.6 | 3.7 |
| 0.6 (.672) | 0.2 | 1.8 | 3.6 |
| 0.5 (.560) | 0.2 | 2.8 | 3.7 |
| 0.3 (.336) | 0.1 | 1.9 | 3.6 |

Utilizing compositions formulated in accordance with TABLE I, several trialkylammonium salts exhibited unexpected plant growth regulatory properties as illustrated by the test set forth in Example 1.

EXAMPLE 1

A number of soybean plants, variety Corsoy, are grown from seeds in aluminum pans in the greenhouse for a period of approximately 1 week to the primary leaf stage. The plants are thinned to three uniform plants in each pan and the height of each plant in the pan is measured to the terminal bud and the average height is noted. One pan containing three soybean plants is used for each chemical treatment and three pans are not treated and used as a control. The composition as formulated in accordance with TABLE I is then applied to the pan of growing plants by overhead spray at a rate equivalent to the desired rate of active ingredient per acre. The treated pans, along with the control pans, are maintained in a greenhouse and watered from below on a sand bench and fertilized with a uniform portion of a water-soluble balanced fertilizer.

Two weeks after application of the chemical, the average height of the soybean plants in the treated pan is again measured as above and the difference in the average height before and two weeks after application represent the increase in the development of the treated pans. This development in growth of the treated plants is compared to the average increase in growth of the plants in the control pans during the same period of time. A variation of 25% or more in the development of at least two-thirds of the treated plants when compared to the development of the control plants demonstrates that the chemical is an effective plant regulant. Thus, a chemical is considered active when the treated plants manifest a decrease in growth of at least 25% less than that of the control plants, i.e., stature reduction, or an increase in growth in excess of 25% of that of the control plants, i.e., growth stimulation.

TABLE II below summarizes the results and observations made in accordance with Example 1 when the trialkylammonium salts of the invention were utilized as the active ingredient at several rates. Some slight phytotoxicity was noted, especially at the higher application rates.

TABLE II

| Active Ingredient | RATE (Lbs/Acre) | Results |
| --- | --- | --- |
| Tributyl[o-carboxybenzyl]ammonium bromide, methyl ester | 6.0 | Stature Reduction, Altered Canopy |
| " | 3.0 | Stature Reduction, Altered Canopy, Dark Foliar Color |
| " | 1.2 | Stature Reduction, Altered Canopy, Dark Foliar Color |
| " | 0.6 | Stature Reduction, Altered Canopy |
| Tributyl[m-carboxybenzyl]ammonium bromide, methyl ester | 6.0 | Dark Foliar Color, Leaf Inhibition, Axillary Bud Development |
| " | 3.0 | Stature Reduction, Dark Foliar Color, Axillary Bud Development |
| " | 1.2 | Stature Reduction, Dark Foliar Color, Altered Canopy, Axillary Bud Development |
| " | 0.6 | Stature Reduction, Dark Foliar Color, Altered Canopy, Axillary Bud Development |
| " | 0.3 | Stature Reduction, Dark Foliar Color, Altered Canopy, Axillary Bud Development |
| Tributyl[p-carboxybenzyl]ammonium bromide, methyl ester | 6.0 | Stature Reduction, Altered Canopy, Dark Foliar Color |
| " | 3.0 | Stature Reduction, Altered Canopy |
| Tributyl[p-carboxybenzyl]ammonium bromide, methyl ester | 1.2 | Stature Reduction, Altered Canopy |
| Tributyl[o-carboxybenzyl]ammonium bromide, propyl ester | 6.0 | Stature Reduction, Altered Canopy, Dark Foliar Color |
| " | 3.0 | Stature Reduction, Altered Canopy, Dark Foliar Color |
| " | 1.2 | Stature Reduction, Altered Canopy, Dark Foliar Color |
| Tributyl[m-carboxybenzyl]ammonium bromide, propyl ester | 6.0 | Defoliation, Leaf Inhibition, Axillary Bud Development |
| " | 3.0 | Stature Reduction, Axillary Bud Development, Dark Foliar Color |
| " | 1.2 | Stature Reduction, Altered Canopy, Dark Foliar Color, Axillary Bud Development |
| " | 0.6 | Stature Reduction, Altered Canopy, Dark Foliar Color, Axillary Bud Development |
| " | 0.3 | Stature Reduction, Altered Canopy, Dark Foliar Color, Axillary Bud Development |
| " | 0.12 | Stature Reduction, Altered Canopy, Dark Foliar Color, Axillary Bud Development |
| Tributyl[p-carboxybenzyl]ammonium bromide, propyl ester | 6.0 | Altered Canopy, Axillary Bud Development |
| Tributyl[p-carboxybenzyl]ammonium bromide, propyl ester | 3.0 | Stature Reduction, Altered Canopy |
| " | 1.2 | Stature Reduction, Altered Canopy, Axillary Bud Development |
| Trimethyl[o-carboxybenzyl]ammonium bromide, methyl ester | 6.0 | Stature Reduction, Altered Canopy |
| Trimethyl[m-carboxybenzyl]ammonium bromide, methyl ester | 6.0 | Dark Foliar Color |
| " | 3.0 | Stature Reduction, Dark Foliar Color Axillary Bud Development |
| Tripropyl[m-carboxybenzyl]ammonium bromide, methyl ester | 6.0 | Stature Reduction, Altered Canopy, Dark Foliar Color, Axillary Bud Development |
| " | 3.0 | Stature Reduction, Dark Foliar Color |
| " | 1.2 | Stature Reduction, Dark Foliar Color |

Further advantages of this invention are shown in Example 2.

EXAMPLE 2

Individual soybean plants, variety Corsoy, are grown from seed in 6 inch pots containing a good grade of top soil. Two pots of 6-week old plants (5–6 trifoliate stage) are used for each application of the chemical. An overhead spray of an aqueous composition of the chemical is applied to the pots at an equivalent rate as indicated below. Two to four sets of plants which received no chemical application are included and serve as controls. All of the pots are maintained under good growing conditions and are watered and are fertilized with a uniform amount of a water-soluble balanced fertilizer. Two weeks after the application of the chemical, the growth responses of the treated plants are compared with that of the control plants. The total height of the plant is measured to the tip of the terminal bud. A variation of 15% in the average total height of the treated plants, when compared to the average total height of the control plants, demonstrate that the chemical is an effective plant growth regulator. Observations made utilizing the test procedure of Example 2 are summarized in TABLE III.

TABLE III

| Active Ingredient | RATE (Lbs/Acre) | Results |
| --- | --- | --- |
| Tributyl[m-carboxybenzyl]ammonium bromide, methyl ester | 1.0 | Stature Reduction, Dark Foliar Color |
| " | 0.5 | Stature Reduction, Dark Foliar Color |
| " | 0.25 | Stature Reduction, Dark Foliar Color |
| Tributyl[m-carboxybenzyl]ammonium bromide, propyl ester | 0.5 | Stature Reduction, Dark Foliar Color Axillary Bud Development |
| " | 0.15 | Stature Reduction, Dark Foliar Color |
| " | 0.05 | Stature Reduction, Dark Foliar Color |
| Tripropyl[m-carboxybenzyl]ammonium | | |

TABLE III-continued

| Active Ingredient | RATE (Lbs/Acre) | Results |
|---|---|---|
| bromide, methyl ester | 1.0 | Stature Reduction, Dark Foliar Color, Thick Leaf Texture, Inhibited Pod Set |
| '' | 0.5 | Stature Reduction, Thick Leaf Texture, Leaf Inhibition, Axillary Bud Inhibition |
| '' | 0.25 | Stature Reduction, Thick Leaf Texture, Leaf Inhibition, Leaf Distortion, Axillary Bud Inhibition |

A preferred embodiment of the invention comprises the application of tributyl(m-carboxybenzyl)ammonium bromide, propyl ester to leguminous plants, such as soybeans, in order to effect a stature reduction. Soybeans of the Wayne variety were planted (234,000 plants per acre) and treated with a composition containing tributyl(m-carboxybenzyl)ammonium bromide at early flowering, approximately six weeks after planting. Rates ranging from 0.1 to 0.5 pounds per acre produced stature reduction as well as a darkening of the foliar color. Yield and seed weight ranged from 94 to 101% of the control. When statistical error is considered, this variance is not deemed to be significant.

Generally, the trialkylammonium salts useful in accordance with the invention may be prepared by reacting the appropriate alkyltoluate with the appropriate amine in the presence of acetonitrile. The entire reaction scheme in which toluic acid is used to form the appropriate alkyltoluate may be represented as follows:

Although the above preparation may be utilized to prepare ortho, meta or para (carboxybenzyl)trialkylammonium salts, if ortho compounds are desired, the appropriate alkyltoluate may also be prepared as described in the Netherland Application 6,614,224, as cited in *Chem. Abstracts* 68, 2905b (1968).

Examples 3 through 10 are presented to further illustrate the preparation of the trialkylammonium salts of the invention and are not intended as a restriction of the scope of the invention. Temperatures are understood to be degrees Centigrade (°C.).

EXAMPLE 3

PREPARATION OF TRIBUTYL(p-CARBOXYBENZYL) AMMONIUM BROMIDE, METHYL ESTER

A solution of 2.74 grams of tributylamine and 3.38 grams of methyl α-bromo-m-toluate in 15.5 grams of

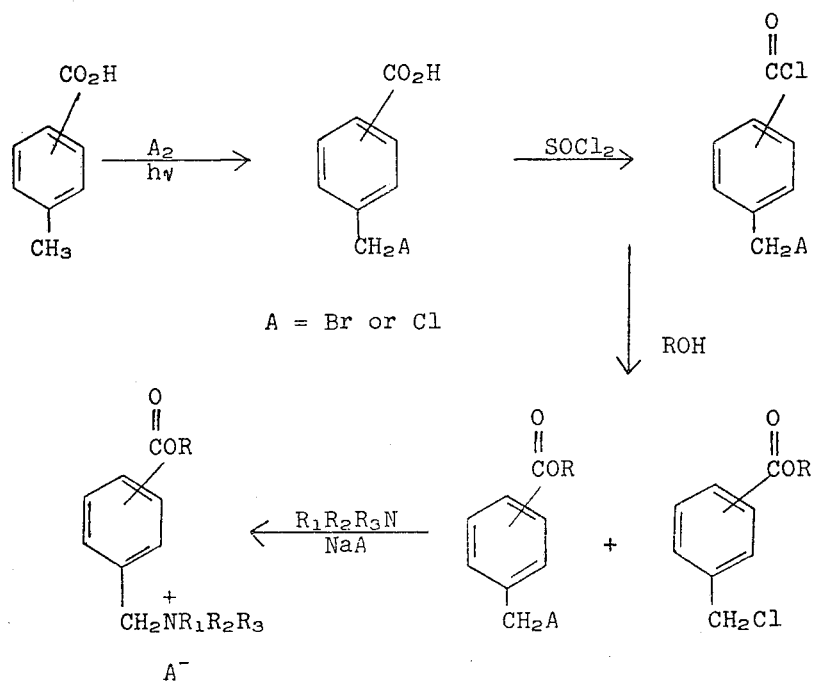

where R, $R_1$, $R_2$ and $R_3$ are defined as above. Should the iodide salt be desired, the bromide or chloride salt is merely reacted with NaI. If the salt desired is a nitrate, carbonate or sulfate, the bromide or chloride salt is passed through an ion exchange column charged with the appropriate anion.

acetonitrile was held at reflux for 2.33 hours and then concentrated under vacuum. The residue was crystalized from cold $CH_3CN$-EtOAc-ether to give 3.95 grams of white crystals, mp~122.

Anal. Calcd. for $C_{21}H_{36}BrO_2$: C, 60.86; H, 8.76.
FOUND: C, 60.62; H, 8.65

EXAMPLE 4

PREPARATION OF TRIBUTYL(o-CARBOXYBENZYL) AMMONIUM BROMIDE, n-PROPYL ESTER

A solution of 20.0 g. of α-bromo-o-toluoyl chloride and 5.56 g. of n-propanol was stirred overnight and then was concentrated under vacuum (T = 40°). The residue was dissolved in ether and the resultant solution was washed with water and sodium bicarbonate solution. The ether layer was dried and concentrated. A solution of the residue, 100 ml. of acetonitrile and 15.8 g. of tributyl amine was held at reflux for three hours and then was concentrated under vacuum. The residue was dissolved in 350 ml. of water and extracted with ether. The aqueous layer was added to sodium bromide solution giving a yellow oil. The solution was extracted with methylene chloride. The $CH_2Cl_2$ layer was dried and concentrated under vacuum to give an oil.

Anal. Calcd. for $C_{23}H_{40}BrNO_2$: C, 62.43; H, 9.11.
FOUND: C, 62.24; H, 9.17.

EXAMPLE 5

PREPARATION OF TRIBUTYL-(m-CARBOXYBENZYL) AMMONIUM BROMIDE, PROPYL ESTER

A mixture of 13.4 g. of 86% pure propyl α-bromo-m-toluate and 7.95 g. (0.043 mol.) of tributylamine in 45 ml. of $CH_3CN$ was held at reflux for 1.5 hrs., was cooled, diluted to 500 ml. with ether, and was filtered to give 13.4 g. of solid, mp 137°–139°. Recrystallization of the solid from 400 ml. of ethyl acetate gave 12.4 g. (65% yield) of solid, mp 138°–140°.

Anal. Calcd. for $C_{23}H_{40}BrNO_2$: C, 62.43; H, 9.11.
FOUND: C, 62.52; H, 9.05.

EXAMPLE 6

PREPARATION OF TRIBUTYL-(m-CARBOXYBENZYL) AMMONIUM BROMIDE, METHYL ESTER

A mixture of 22.9 g. of methyl α-bromo-m-toluate and 18.5 g. of tributylamine in 100 ml. of $CH_3CN$ was held at reflux for 3.5 hrs. and was diluted to 400 ml. with ethyl acetate. The resultant 30.6 g. of solid, mp. 168°–173°, was recrystallized from $CH_3CN$-EtOAc to give 27.6 g. of white solid, mp 170°–181°.

Anal. Calcd. for $C_{21}H_{36}BrNO_2$: C, 60.86; H, 8.76.
FOUND: C, 61.06; H, 8.73.

EXAMPLE 7

PREPARATION OF (m-CARBOXYBENZYL)TRIMETHYLAMMONIUM BROMIDE, METHYL ESTER

A solution of 5.9. g. of trimethylamine in 100 ml. of $CH_3CN$ was added at once to 22.9 g. of melted methyl α-bromo-m-toluate with swirling. An exothermic reaction raised the temperature to 58°. After 5 minutes, the solution was diluted to 400 ml. with ethyl acetate and was allowed to stand. The resultant 27.2 g. of solid, mp 176°–180°, was recrystallized from $CH_3CN$ to give 14.1 g. of solid, mp 185°–186°. Dilution of the filtrate with ethyl acetate gave 10.4 g. of solid, mp 177°–182°, which gave 8.1 g. of solid, mp 183°–185°, upon recrystallization from $CH_3CN$.

Anal. Calcd. for $C_{12}H_{18}BrNO_2$: C, 50.01; H, 6.30.
FOUND: C, 50.24; H, 6.34.

EXAMPLE 8

PREPARATION OF TRIMETHYL(o-CARBOXYBENZYL) AMMONIUM BROMIDE, METHYL ESTER

A solution of 3.5 g. (0.016 mol.) of α-bromo-m-toluic acid, methyl ester, 1.1 g. (1 equiv. wt.) of trimethyl amine, and ether was stirred at 23° overnight and the resultant precipitate, 4.0 g. of solid, mp 100°–103°, was filtered off. The solid was recrystallized from $CH_3CN$-EtOAc to give 0.7 g. of solid, mp 109°–110.5°. The residue from the filtrate was recrystallized from $CH_3CN$-EtOAc to give 2.35 g. of solid, mp 109.5°–111.5°. The crystals were combined and recrystallized from $CHCl_3$-ether to give 1.0 g. of a hygroscopic solid, mp 108°–110.5°.

Anal. Calcd. for $C_{12}H_{18}BrNO_2 \cdot 1H_2O$: C, 47.07; H, 6.58.
FOUND: C, 47.30; H, 6.60.

EXAMPLE 9

PREPARATION OF TRIBUTYL(o-CARBOXYBENZYL) AMMONIUM BROMIDE, METHYL ESTER

A solution of 19.9 g. (0.085 mol.) of α-bromo-m-toluoyl chloride and 3.21 g. (1.05 equiv. wts.) of cold methanol was stirred at 23° over the weekend. The resultant oil was dissolved in ether and washed with ice water and sodium bicarbonate solution. The ether layer was dried and concentrated to give 10.58 g. of an oil. A solution of 6.0 g. of the oil, acetonitrile, and 3.7 g. (0.02 mol.) of tributylamine was stirred at 23° overnight. An additional 1.5 ml. of tributyl amine was added and the solution was stirred overnight. The resultant mixture was concentrated under vacuum. The residue was dissolved in water and extracted with ether. The aqueous layer was poured into sodium bromide solution and extracted with chloroform. The chloroform solution was dried and concentrated to give 12.03 g. of an oil shown by nmr to contain 7.5% chloroform.

Anal. Calcd. for $C_{21}H_{36}BrNO_2 \cdot 0.075\ CHCl_3$:
C, 57.06; H, 8.18.
C, 57.06; H, 7.43.

EXAMPLE 10

PREPARATION OF TRIPROPYL(m-CARBOXYBENZYL) AMMONIUM BROMIDE, METHYL ESTER 0.02 moles of tripropylamine is added to 0.02 moles of m-bromo methyl benzoate in 30 ml. of acetonitrile and heated to reflux for 4 hours. After cooling, the mixture was diluted with ether and filtered to give 7.0 g. of a solid melting at 80°–85°.

Anal. Calcd. for $C_{18}H_{30}BrNO_2$: C, 58.06; H, 8.12.
FOUND: C, 58.29; H, 8.16.

Although this invention has been described with respect to specific modification, the details thereof are not to be construed as limitations, for it will be apparent that various equivalents, changes and modifications may be resorted to without departing from the spirit and scope thereof and it is understood that such equivalent embodiments are intended to be included herein.

What is claimed is:
1. A method of regulating the growth of leguminous plants which comprises treating said leguminous plants with an effective amount of a compound of the formula

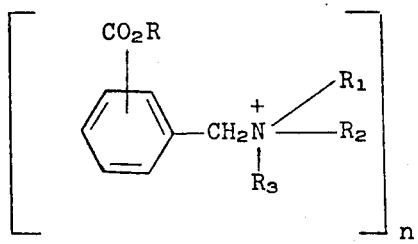

where R is a lower alkyl; $R_1$, $R_2$ and $R_3$ are independently lower alkyl, with the proviso that when R is propyl in the ortho position, $R_1$, $R_2$ and $R_3$ are not methyl; $X^{-n}$ is an anion selected from the group consisting of $Br^-$, $Cl^-$, $I^-$, $NO_3^-$, $SO_4^{-2}$ and $CO_3^{-2}$; and n is the numerical value of the valence state of the anion $X^{-n}$.

2. The method of claim 1 wherein $R_1$, $R_2$ and $R_3$ are the same.

3. The method of claim 2 wherein $R_1$, $R_2$ and $R_3$ are methyl.

4. The method of claim 2 wherein $R_1$, $R_2$ and $R_3$ are butyl.

5. The method of claim 4 wherein R is methyl.

6. The method of claim 5 wherein X is Br and $n$ is 1.

7. The method of claim 4 wherein R is propyl.

8. The method of claim 7 wherein X is Br and $n$ is 1.

9. The method of claim 1 wherein said plant is soybean.

10. The method of claim 1 wherein said $-CO_2R$ substituent is in the meta position.

* * * * *